April 14, 1936.                P. M. THOMPSON                2,037,100
                            MACHINE FOR DUSTING BRAN
                     Filed May 22, 1934        2 Sheets-Sheet 1
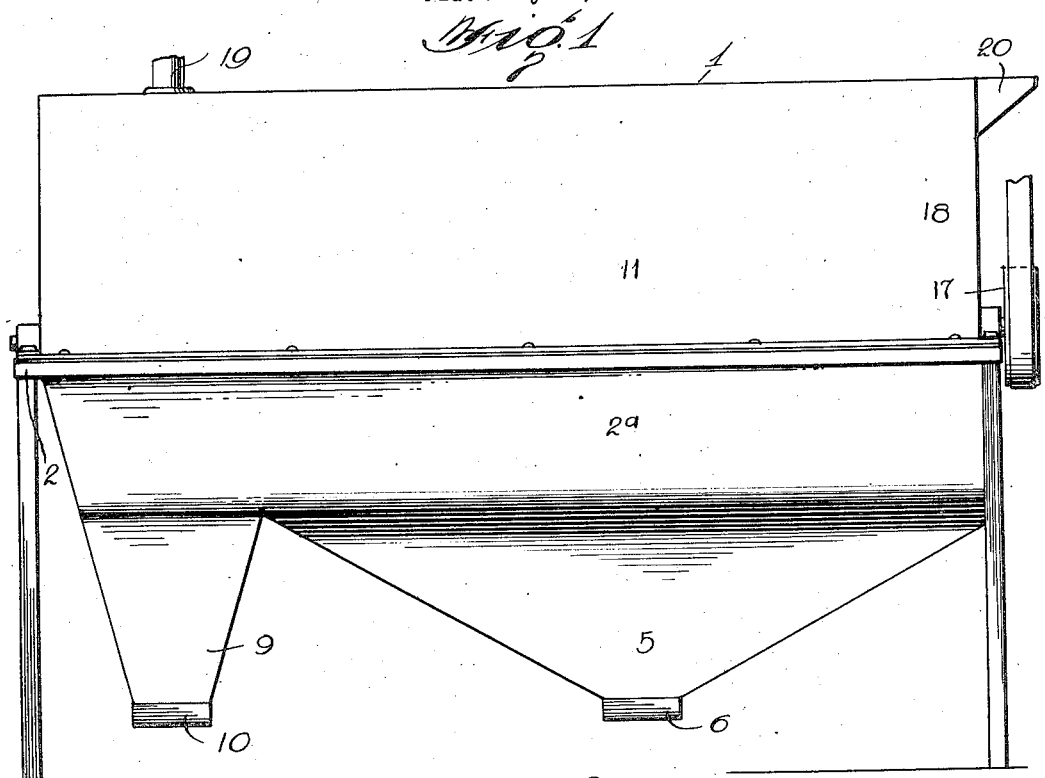
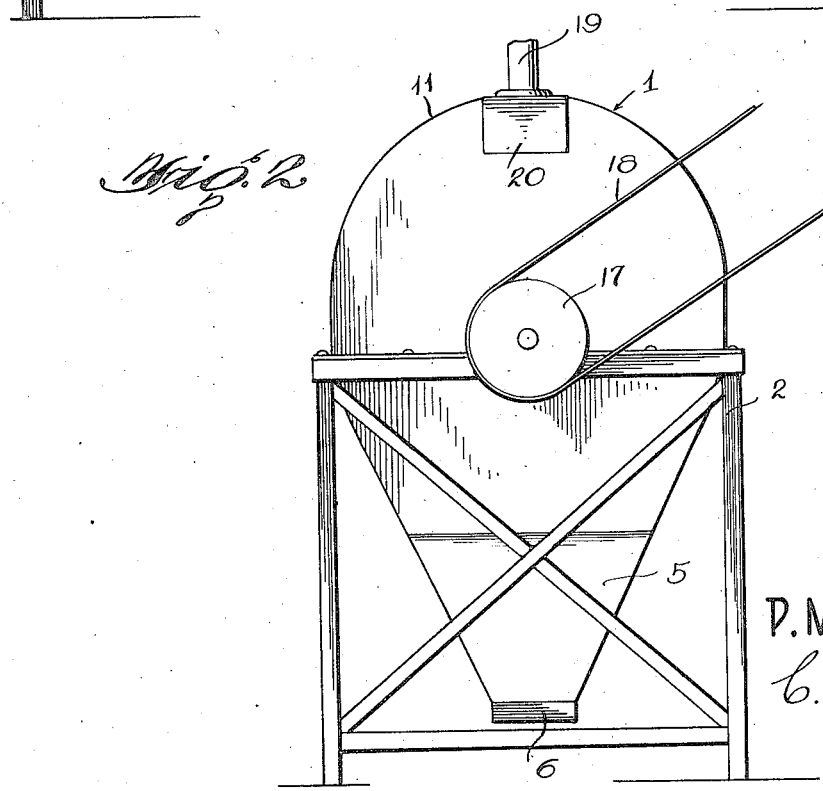
Inventor
P. M. Thompson
C. F. Haden
Attorney April 14, 1936.   P. M. THOMPSON   2,037,100
MACHINE FOR DUSTING BRAN
Filed May 22, 1934   2 Sheets-Sheet 2
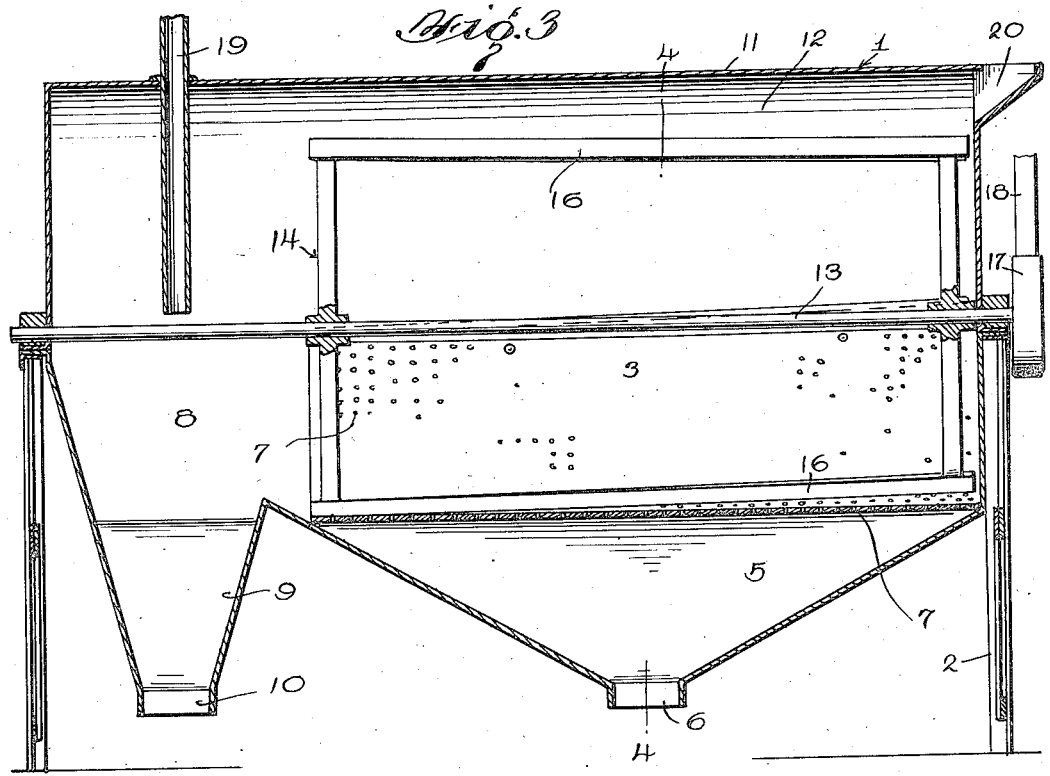
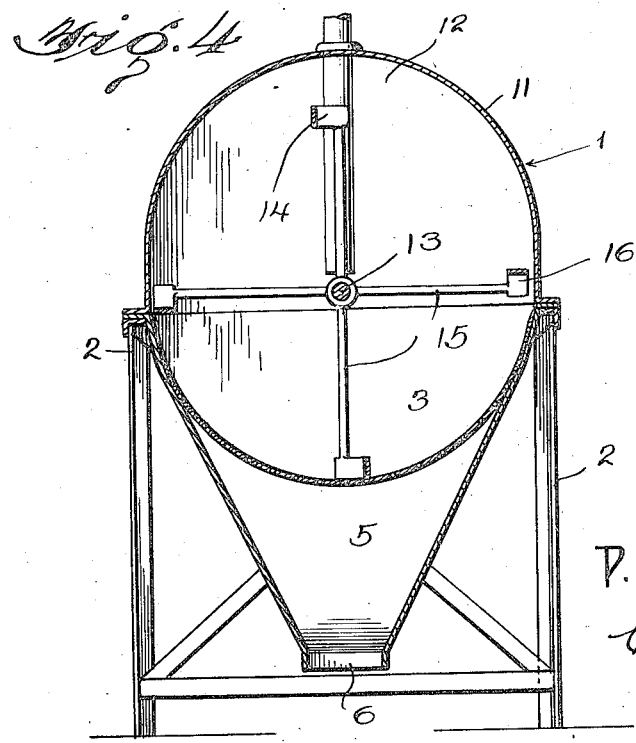
Inventor
P. M. Thompson
C. F. Haden
Attorney Patented Apr. 14, 1936

2,037,100

UNITED STATES PATENT OFFICE 2,037,100

MACHINE FOR DUSTING BRAN

Peyton M. Thompson, Mansfield, Ohio

Application May 22, 1934, Serial No. 726,989

2 Claims. (Cl. 209—283)

This invention relates to flour mills and more particularly to a method and a machine for dusting bran in such mills.

A primary object of the invention is to provide a method, and a bran dusting machine constructed to effectively take out the flour left in the bran after the material passes thru the flour bolt or sifter and which is operated without force.

These and other features of the invention, including new and important details of construction and combination of parts, will be hereinafter more particularly described and claimed.

In the accompanying drawings Figure 1 represents a side elevation of a bran dusting machine embodying this invention;

Fig. 2 is an end elevation thereof;

Fig. 3 is a longitudinal section; and

Fig. 4 is a transverse vertical section taken on line 4—4 of Fig. 3.

In the embodiment illustrated the bran dusting machine 1 constituting this invention comprises a suitably braced supporting frame 2, depending from the upper portion of which is a casing 2ª constructed to form a working chamber 3 and a bran settling chamber 8. The working chamber 3 merges at its lower portion into a flour hopper 5 having an outlet 6. Between the hopper and the working chamber is a semi-cylindrical steel screen 7 which covers the bottom of the working chamber.

The bran settling chamber 8, which is located adjacent one end of the working chamber and communicating therewith, merges at its lower end into a bran hopper 9 having a bran discharge outlet 10.

A hood 11 is supported at the upper end of frame 2, being preferably semi-cylindrical with a relief chamber 12 formed at its rounded top portion. Journalled in the ends of frame 2 and extending longitudinally thereof is a suitably driven shaft 13 having fixed to the portion thereof which extends thru the working chamber 3, a steel reel 14. This reel carries on arms 15 a plurality of longitudinally extending narrow steel brushes 16 formed on a slight spiral so as to feed the bran into the chamber 8. These brushes pass within three-eighths of an inch, more or less, of the screen 7, the speed of the reel being between 2,000 and 2,500 R. P. M. and driven by a pulley and belt 17 and 18.

The hood at its rounded top portion extends beyond the path of the brushes 16 forming the relief chamber 12 into which the heavy parts of bran are thrown clear of the brushes and fall back in said path and are struck by the brushes thus separating the flour from the bran.

The flour so separated from the bran passes thru the screen openings into the hopper 5 and is delivered thru the outlet 6 into a suitable receptacle, not shown.

An air tube or pipe 19 extends thru the hood 11 into the bran settling chamber 8 and supplies the air necessary for the operation of the machine.

A bran stock inlet chute 20 opens into the hood 10 at the end opposite that thru which the air tube extends and is designed for feeding the bran to be treated to the machine.

In the operation of this machine the bran from the flour bolt, not shown, is fed thru chute 20 into the working chamber 3 of the duster and the rapid rotation of the reel 14 causes the brushes 16 to engage the bran particles and throw them out into the relief chamber 12 and the flour dropping from these particles passes thru the screen 7 into the flour hopper 5 and out thru the outlet 6. The lighter cleaned particles of bran pass into the bran settling chamber 8 being so directed by the spiral arrangement of the brushes 16. From this chamber the air entering thru pipe 19 directs the bran into hopper 9 and out thru the discharge 10. As above stated the heavier particles of bran which are thrown out by the brushes into the relief chamber fall back into the path of the brushes and are struck by them breaking any flour remaining thereon loose from the bran and the so separated flour and bran follow the course above described.

I claim as my invention:

1. In a bran duster the combination of a suitably supported casing containing a work chamber, a flour receiving hopper below the work chamber, a screen between the work chamber and the flour receiving hopper, a relief chamber above and in communication with the work chamber, a bran settling chamber at the end of and communicating with the work chamber, a bran hopper below the bran settling chamber, a reel mounted to rotate in the work chamber and having a plurality of longitudinally extending spirally arranged brushes thereon, means to rotate the reel with the path of the brushes wholly below the relief chamber, whereby bran is thrown from the brushes into the relief chamber and as it drops back into the work chamber it is again acted upon by the brushes.

2. In a bran dusting machine the combination of a suitably supported casing containing a work chamber, a flour receiving hopper below the work chamber, a screen between the work chamber and the flour receiving hopper, a relief chamber above and in communication with the work chamber, a bran settling chamber at the end of and in communication with the work chamber, an air tube extending from outside the machine into the bran settling chamber, a bran hopper below the bran settling chamber, a reel mounted to rotate in the work chamber and having a plurality of longitudinally extending spirally arranged brushes thereon, means to rotate the reel with the path of the brushes wholly below the relief chamber, whereby bran is thrown from the brushes into the relief chamber and as it drops back into the work chamber it is again acted upon by the brushes.

PEYTON M. THOMPSON.